UNITED STATES PATENT OFFICE.

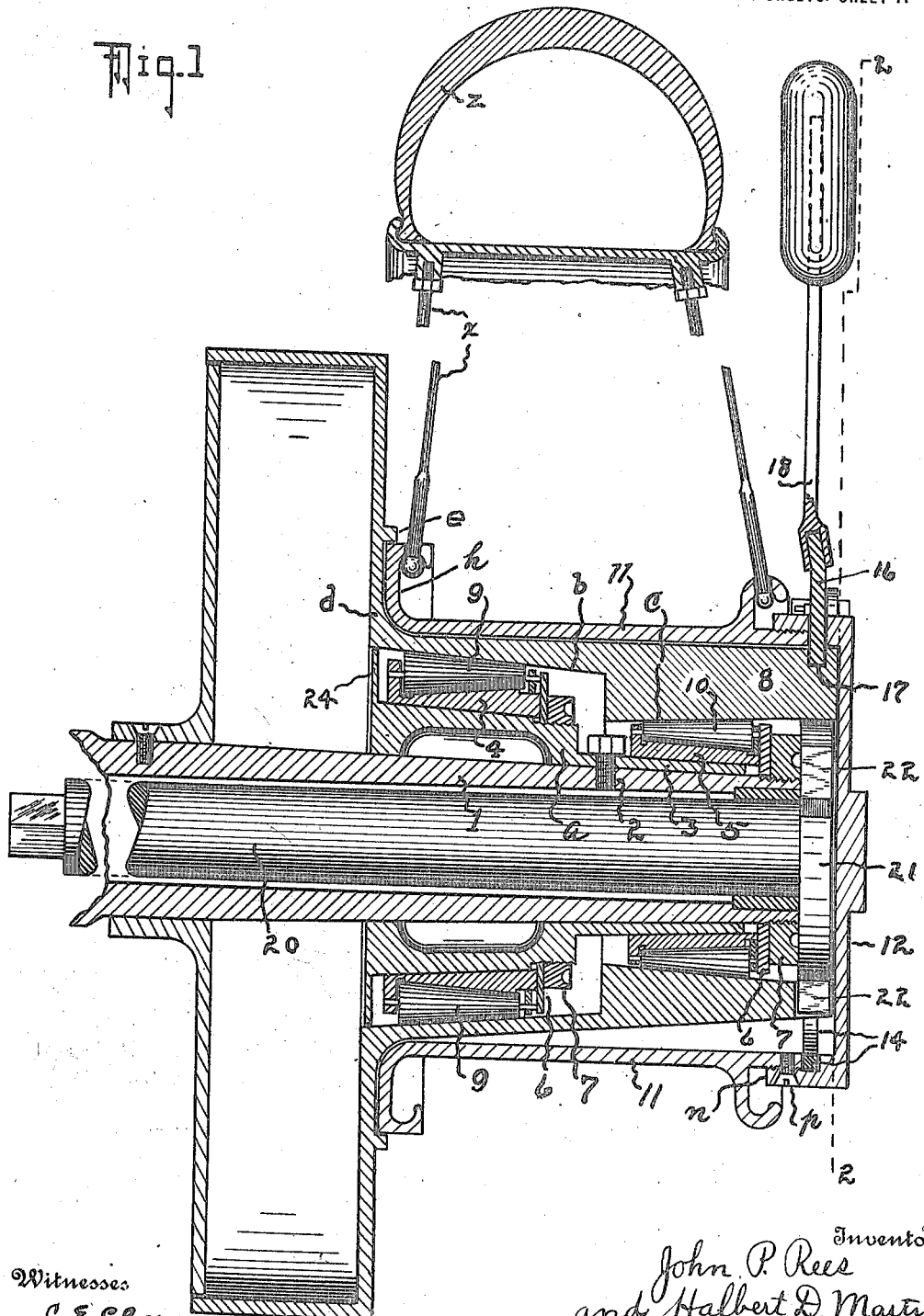

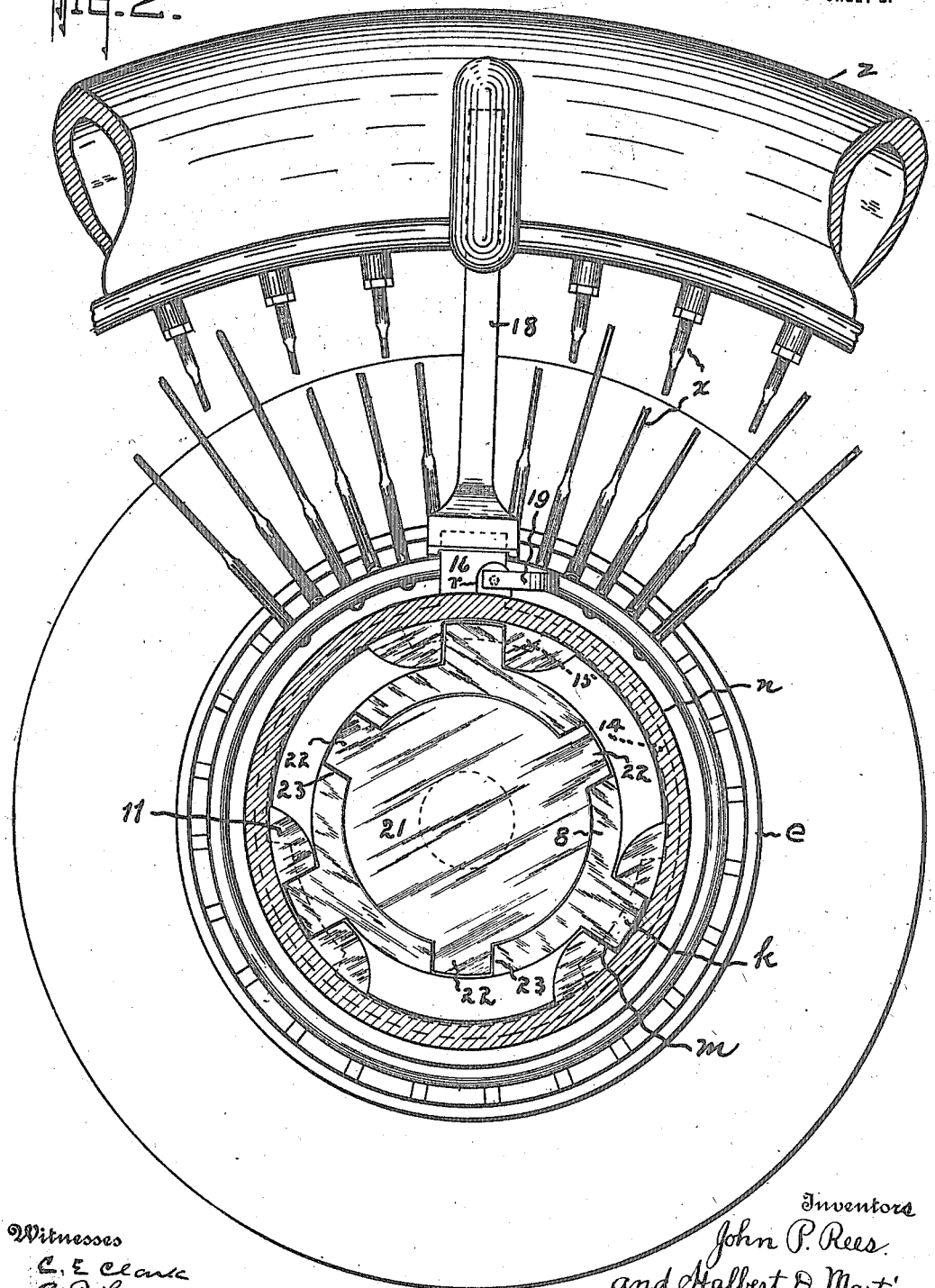

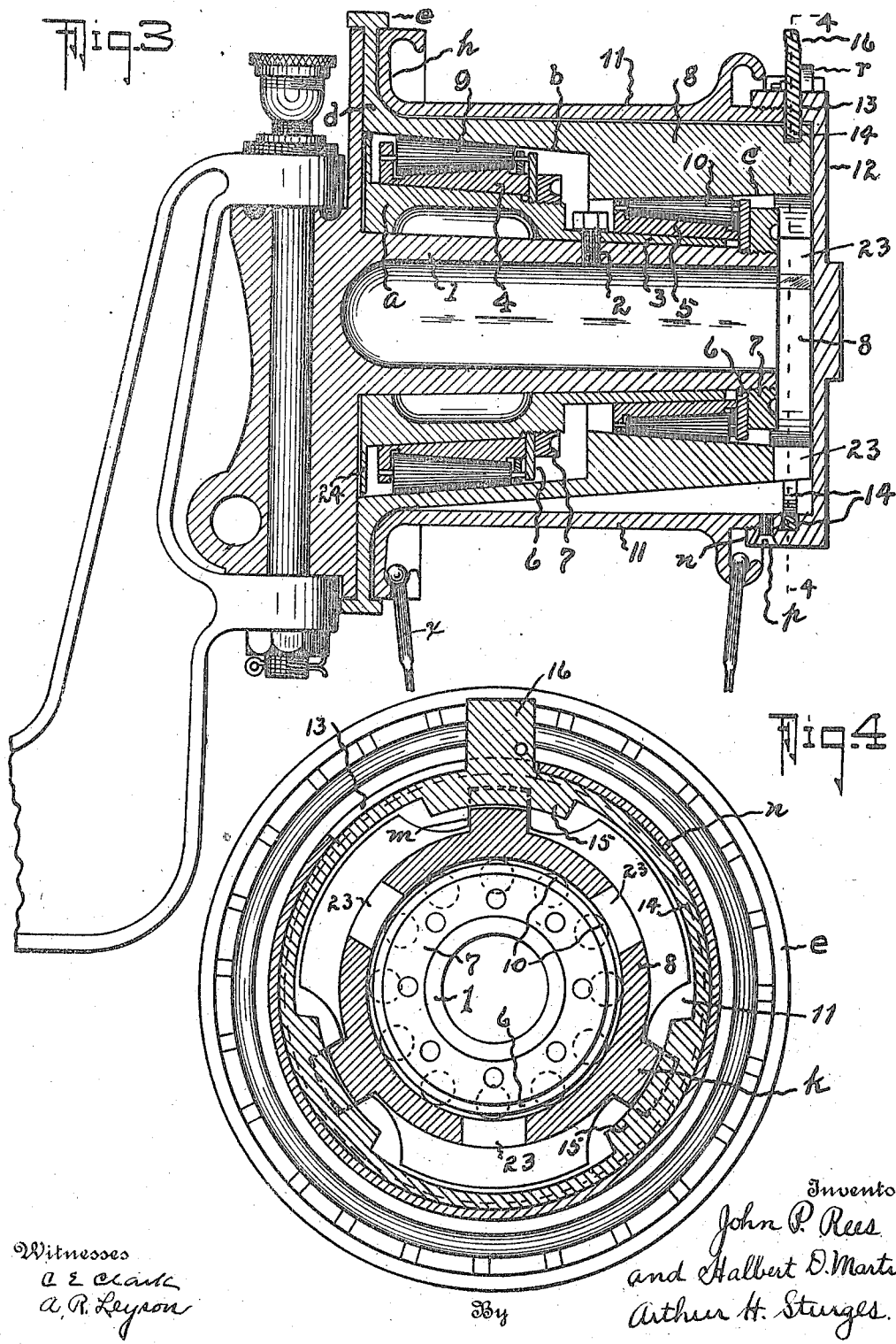

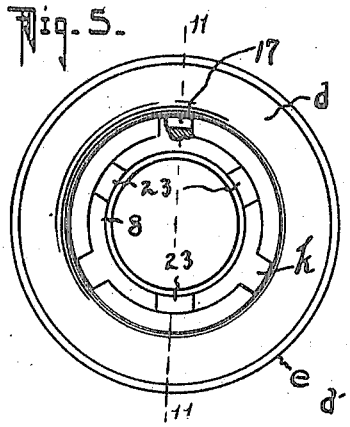
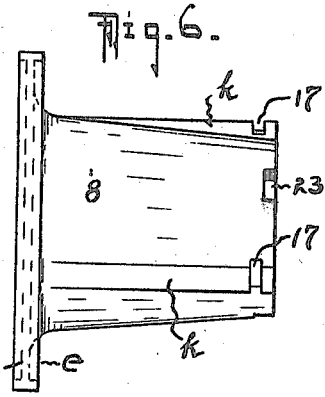
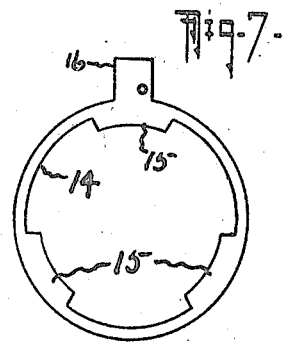
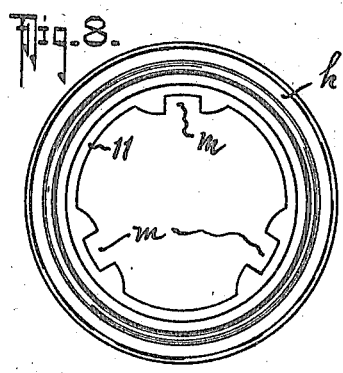
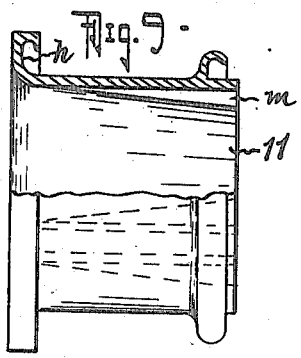
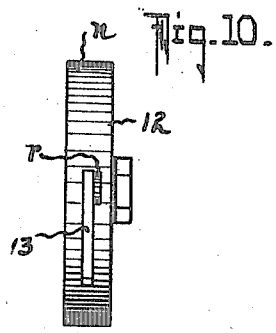
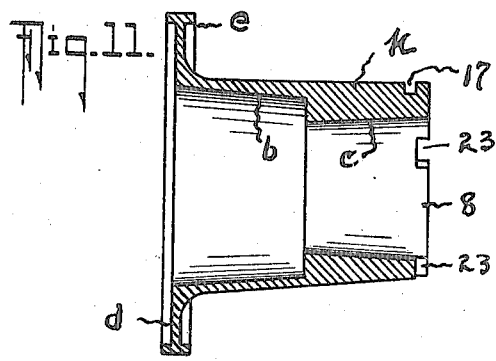

JOHN P. REES AND HALBERT D. MARTIN, OF HAMBURG, IOWA, ASSIGNORS OF ONE-TENTH TO ARTHUR H. STURGES, OF OMAHA, NEBRASKA.

VEHICLE-WHEEL.

1,181,801.   Specification of Letters Patent.   Patented May 2, 1916.

Application filed June 7, 1915. Serial No. 32,486.

*To all whom it may concern:*

Be it known that we, JOHN P. REES and HALBERT D. MARTIN, citizens of the United States, residing at Hamburg, in the county of Fremont and State of Iowa, have invented certain new and useful Improvements in Vehicle-Wheels, of which the following is a specification.

This invention relates to an improvement in detachable vehicle wheels and has for its principal object to provide a two-part hub so arranged that the outer part, which is connected with the spokes and tire may be quickly mounted upon or removed from a central part.

The invention includes a construction tending to resist lateral stresses to advantage when moving upon curves or at great speed, as required for racing automobiles, and to provide such a mounting for the rear and front wheels that they may be interchanged without inconvenience, and has reference to the use of parts which will be of simple construction so that they will be durable and that manufacture will be convenient and economical.

With the foregoing objects in view, and others to be mentioned hereinafter, the invention presents a novel and useful construction, combination and arrangement of parts as described herein and claimed, and as illustrated in the accompanying drawings, it being understood that changes in form, size, proportion and minor details may be made within the scope of the appended claims without departing from the spirit of the invention or sacrificing any of its advantages.

In the drawing, Figure 1 is a vertical section of a hub with fragments of the spokes and tire as applied to a rear or driving axle, a special tool being also shown in place for detaching the outer hub member from the inner hub member. Fig. 2 is an end view of the wheel, being a section through the screw cap, as on line 2 2 of Fig. 1. Fig. 3 is a vertical section of a hub with fragments of the spokes, showing the hub mounted on a front axle, means for steering being omitted. Fig. 4 is a transverse section of the hub, as on line 4 4 of Fig. 3. Figs. 5, 6, 7, 8, 9 and 10 are detail views. Fig. 5 is an end view, partly in section, of the inner hub member. Fig. 6 is a plan view of the inner hub member. Fig. 7 is an end view of the locking ring. Fig. 8 is an end view of the outer hub member. Fig. 9 is a side view, partly broken and in section, of the outer hub member. Fig. 10 is a plan view of the screw cap. Fig. 11 is a view in longitudinal section of the inner hub member, on line 11 11 of Fig. 5.

Referring now to the drawing, numeral 1 indicates a cylindrical, non-rotatable, outwardly convergent support disposed centrally of the wheel hub, and upon said support is secured, by means of keepers 2, a sleeve 3, said sleeve also being formed outwardly convergent and provided near its inner end with an annular boss $a$ which is formed convergent toward the middle of the sleeve.

At 4 and 5 are respectively indicated roller bearing collars each having an inner wall formed flaring toward the inner end of the hub. The parts thus mentioned may be readily assembled, washers and ring nuts respectively indicated at 6 and 7 being employed, and by rotating them on their threaded mountings, the collars may be adjusted or pressed toward the inner end of the hub to a suitable contact with the sleeve and the boss $a$, so that any movement of the collars with respect to the sleeve, either transversely or longitudinally of the hub, will be prevented.

At 8 is indicated an inner hub member or sleeve having its inner wall formed with flaring bearing surfaces $b$ and $c$ extending from substantially its middle to its respective ends and provided at its inner end with an annular flange $d$ having an annular stop or ridge $e$ formed on its outer side. When assembling the parts, the hub member 8 is so disposed that its flaring wall $b$ will engage the series of rollers 9 upon the collar 4, after which the collar 5 is mounted upon the sleeve 3, and it will be noted that after this collar is secured by its washer and ring nut, a longitudinal movement of the inner hub member on its mounting will be prevented since the series of rollers 9 and the series of rollers 10 are formed inwardly convergent, the walls of the hub member 8 which engages said rollers being formed to flare outwardly.

It will be understood that the inner hub member 8 may freely rotate while engaged by the rollers 9 and 10. Mounted upon said member 8 is an outer hub member or spoke-bearing sleeve 11 provided with an annular flange $h$ adapted to register with the flange $d$. In order that the outer hub member will move with member 8 and may be conveniently removed therefrom, said member 8 is provided with lugs or ribs $k$ extending longitudinally thereof and projecting radially therefrom, said lugs or ribs being adapted to be disposed in the channels $m$ which are provided in the inner side of the spoke-bearing hub 11, and when detaching a wheel the outer hub member may have a sliding movement outwardly of the inner hub member 8 while the ribs $k$ are engaging in the channels $m$, the flange $h$ being disengaged from the flange $d$. Each of the ribs $k$, near its outer end, is provided with a transverse groove 17 which opens on its outer side.

At 12 is indicated a screw-cap, its annular flange $n$ being adapted to have a threaded connection with the hub member 11, as shown in the drawing. It may be secured to the hub member 11 by suitable keepers $p$ and its flange $n$ is provided with a transversely disposed slot 13.

In order that a removal of the spoke bearing hub member 11 from the inner hub member 8 by unauthorized persons may be prevented, and to prevent an end thrust of said hub member 11, a locking ring 14 is provided, having inwardly projecting lugs 15 and an outwardly projecting tongue piece 16. This rim is disposed within and in engagement with the screw-cap, with its tongue piece disposed in slot 13, and it is adapted to have a limited circular movement while its lugs 15 are disposed in the grooves 17 above mentioned of the inner hub member 8.

When it is desired to detach the wheel, the locking ring 14 may be rotated until its lugs 15 move out of the grooves 17 for being released from the ribs $k$ of the inner hub member, and when thus disposed the outer hub member may have an outward slidable movement for removal. For the purpose of moving the locking ring, any suitable means may be employed, as the wrench 18 which may be applied to the tongue piece.

When it is desired to mount the wheel upon the hub member 8, said wheel, consisting of the hub member 11, the spokes $x$ and tire $z$, the locking ring is adjusted so that its lugs 15 will be disposed adjacent to and at the sides of the ribs $k$ of the inner hub member. The wheel may then be moved inwardly of the vehicle, the outer hub member sliding upon member 8 until its outwardly projecting flange $h$ abuts upon flange $d$. The locking ring should then be moved circularly until its lugs 15 engage in grooves 17 of the ribs $k$, said ring thereby preventing any relative longitudinal movements of said outer and inner hub members; and by use of a suitable keeper or padlock 19 the tongue piece of the locking ring may be secured to the ear piece $r$ of the screw-cap to prevent removal of the wheel from the inner hub member.

As thus described, the flaring sleeve with with its boss $a$, the flaring roller bearing collars 4 and 5, the inner and outer hub members, the screw-cap and the locking ring are the principal parts depended upon, in combination with a central, non-rotatable, cylindrical support, for providing a complete hub for either a rear or front axle, and therefore the wheels may be interchanged whenever desired, this being a feature of great advantage since it provides a convenience in use, and a less cost is required for manufacture.

In Figs. 1 and 2, a rear axle 20 is shown to illustrate facility for use of the invention in connection therewith. It may be rotated or driven by any suitable power, and is provided on its outer end with a disk 21 having radially disposed lugs 22 adapted to engage in recesses 23 which are formed in the outer end of the inner hub member 8, a rotatable movement of the axle 20 thereby causing a rotation of said inner hub member, the outer hub member 11 therefore being rotated since its ribs $k$, as above mentioned, engage in the channels or key-ways $m$ of said outer hub member. Numeral 24 indicates a transverse flange for the boss $a$ of the sleeve 3, tending to prevent dust from entering between the inner hub member and the roller bearing collars.

It is understood that members 1 and 3, as illustrated in Figs. 3 and 4, operate as a central, non-rotatable support for the connected, rotatable hub members 8 and 11 of a "steering wheel," and that, as illustrated in Figs. 1 and 2, said members provide a support, indentically the same, for a "driving" wheel. The fact that the central, cylindrical support 1 provides bearings for a driven axle and therefore discharges an additional function, is not material to the present invention, since the disclosure relates, broadly, to such a construction that wheels may be interchanged and may quickly be detached.

Having fully described the several parts and their uses, a further explanation relating to operation is not necessary.

What we claim and desire to secure by Letters Patent is,—

1. A vehicle wheel, including a hub-member provided with substantially parallel ridges having transverse recesses formed therein, a spoke-bearing sleeve-member carried by said hub-member and provided with key-ways to receive said ridges, a threaded cap having a slotted annular flange, threaded upon said spoke-bearing sleeve-member, a circularly movable locking-ring having lugs and a tongue-piece, said tongue-piece and said lugs being adapted to be received by the slot and the recesses of said cap and said hub-member respectively, and a keeper connected with said tongue-piece for preventing the movement of said locking ring.

2. A vehicle wheel, including a hub-member, a spoke-bearing member splined upon said hub-member, a threaded cap having a flange provided with a slot and connected with said spoke-bearing member, a locking ring provided with lugs and a tongue-piece, said locking ring being disposed about the end of the spoke-bearing member, with its tongue-piece received in the slot of said threaded cap, the lugs of said locking ring normally engaging said hub-member and being revoluble for disengaging its lugs from said hub-member, and a keeper connected with said tongue-piece for the retention of said locking ring against movement.

In testimony whereof, we have affixed our signatures in presence of two witnesses.

JOHN P. REES.
HALBERT D. MARTIN.

Witnesses:
WINNIE BAILEY,
P. J. CILLEY.

Copies of this patent may be obtained for five cents each, by addressing the "Commissioner of Patents, Washington, D. C."